United States Patent
Flynn et al.

(10) Patent No.: US 7,854,917 B2
(45) Date of Patent: Dec. 21, 2010

(54) METHODS OF CONTROLLING THE PARTICLE SIZE OF TITANIUM DIOXIDE PRODUCED BY THE CHLORIDE PROCESS

(75) Inventors: Harry E. Flynn, Edmond, OK (US); Robert O. Martin, Edmond, OK (US); Charles A. Natalie, Edmond, OK (US); Jeffrey W. Giles, Savannah, GA (US)

(73) Assignee: Tronox LLC, Oklahoma City, OK (US)

( * ) Notice: Subject to any disclaimer, the term of this patent is extended or adjusted under 35 U.S.C. 154(b) by 452 days.

(21) Appl. No.: 12/067,091

(22) PCT Filed: Sep. 16, 2005

(86) PCT No.: PCT/US2005/033141

§ 371 (c)(1), (2), (4) Date: Mar. 17, 2008

(87) PCT Pub. No.: WO2007/040466

PCT Pub. Date: Apr. 12, 2007

(65) Prior Publication Data

US 2008/0260627 A1 Oct. 23, 2008

(51) Int. Cl.
*C01G 23/047* (2006.01)
(52) U.S. Cl. ....................... 423/613; 106/437
(58) Field of Classification Search ............... 423/613; 106/437
See application file for complete search history.

(56) References Cited

U.S. PATENT DOCUMENTS

| | | | |
|---|---|---|---|
| 3,208,866 A | 9/1965 | Lewis et al. | |
| 3,512,219 A | 5/1970 | Stern et al. | |
| 4,214,913 A | 7/1980 | Glaeser | |
| 4,803,056 A | 2/1989 | Morris et al. | |
| 5,203,916 A | 4/1993 | Green et al. | |
| 5,204,083 A | 4/1993 | Magyar et al. | |
| 5,536,487 A | 7/1996 | Hartmann | |
| 5,556,600 A | 9/1996 | Gebben et al. | |
| 5,573,744 A | 11/1996 | Gebben et al. | |
| 5,840,112 A | 11/1998 | Morris et al. | |
| 6,207,131 B1 | 3/2001 | Magyar et al. | |
| 6,419,893 B1 | 7/2002 | Yuill et al. | |
| 6,562,314 B2 | 5/2003 | Akhtar et al. | |

FOREIGN PATENT DOCUMENTS

WO 2007/040466 * 4/2007

* cited by examiner

*Primary Examiner*—Steven Bos
(74) *Attorney, Agent, or Firm*—McAfee & Taft

(57) ABSTRACT

A process for manufacturing titanium dioxide by the chloride process is provided. In one embodiment, a particle size control agent comprising an ionizing agent such as potassium chloride is introduced into the reaction zone of the oxidation reactor to control the particle size of the titanium dioxide. In a first aspect, the effectiveness of the particle size control agent in controlling the particle size of the titanium dioxide is improved by adding the particle size control agent to at least one of the reactant streams at a sufficient distance upstream of the oxidization reactor to allow the ionizing agent to efficiently ionize and the particle size control agent to thoroughly admix with the stream(s) prior to entering the reaction zone. In a second aspect, the particle size control agent comprises an ionizing agent and fumed silica. In another embodiment, the amount of alumina added to the reaction zone of the oxidization reactor is increased in order to control the particle size of the titanium dioxide.

20 Claims, 3 Drawing Sheets

METHODS OF CONTROLLING THE PARTICLE SIZE OF TITANIUM DIOXIDE PRODUCED BY THE CHLORIDE PROCESS

BACKGROUND OF THE INVENTION

The present invention relates to methods of controlling the particle size of titanium dioxide produced by oxidizing a titanium halide in the vapor phase.

The production of rutile titanium dioxide by reacting a gaseous titanium halide such as titanium tetrachloride with oxygen (often referred to as the "chloride process") is well known. Heated streams of gaseous titanium halide and oxygen (or an oxygen-containing gas) are combined at high flow rates in a reaction zone of a tubular vapor phase oxidation reactor. Aluminum chloride, typically generated on-site, is often added to the titanium halide stream to promote rutilization of the titanium dioxide. A high temperature oxidation reaction takes place whereby particulate solid titanium dioxide and gaseous reaction products are produced. The titanium dioxide and gaseous reaction products are cooled, and the titanium dioxide particles are recovered. The solid titanium dioxide is very useful as a pigment.

The pressure at which the oxidation reaction is carried out can vary from atmospheric pressure to about 50 psig. It is often desirable to carry out the reaction at a relatively high pressure, i.e., at a pressure that is at least about 15 psig. For example, at a pressure above about 30 psig, the need to recompress recycle chlorine gas is eliminated.

The mean particle size of the resulting titanium dioxide can be important, for example, when the titanium dioxide is to be used as a pigment. The particle size has a direct impact on the optical properties of the pigment. Certain plastics grade pigments require a relatively low particle size.

Unfortunately, the particle size of the titanium dioxide can be difficult to control, particularly when the oxidation reaction is carried out at a relatively high pressure. As the reaction pressure increases, the mean particle size of the titanium dioxide tends to increase as well. The increased pressure increases the density of the particles in the vapor phase in the reactor, which leads to a higher number of particle collisions. The higher number of particle collisions results in coalescence and growth of the particles.

It is known that the particle size of the titanium dioxide in a vapor phase oxidation reactor can be controlled by adding ionizing metals to the reactor. U.S. Pat. No. 3,208,866, assigned to E.I. du Pont de Nemours and Company, teaches that the particle size of the titanium dioxide can be controlled by introducing a metal ion nucleant to the reactor. The metal ion nucleant can be charged to the oxidation reactor either in its elemental state (as a vapor, liquid or solid) or in the form of various inorganic and organic compounds containing the metal. The nucleant is preferably introduced into the reactor by adding it to the oxygen or oxygen-containing gas stream being charged to the reactor. The nucleant prevents the particles from colliding and coalescing.

In accordance with U.S. Pat. No. 5,204,083, assigned to Kerr-McGee Chemical Company LLC, a metal ion-containing compound is introduced into the reaction zone of the oxidation reactor in at least two separate and discrete increments. The first increment is introduced into the reaction zone at a point therein prior to the onset of the reaction between the titanium halide and the oxidizing gas within the reaction zone. A second increment is introduced into the reaction zone at a point therein subsequent to the reaction of at least about 20 weight percent of the titanium halide and the oxidizing gas. The addition of the metal ion-containing compound in separate and discrete increments allows for improved particle size control and avoids certain processing problems associated with the use of metal ion-containing compounds.

U.S. Pat. No. 5,536,487, assigned to Kronos, Inc., describes a process for manufacturing titanium dioxide by the chloride process wherein the metal used to make aluminum trichloride and a particle control additive are introduced by way of two separately-controllable addition branches (a main branch and a subsidiary branch) into the aluminum chloride generator. The particle control additive, an alkali metal salt, is introduced by way of the subsidiary branch in a controlled addition provided by a "dilution" mixture of the salt in aluminum powder. Additional agents are included which improve the free-flowing properties of the mixture.

While the approaches used heretofore for controlling the particle size of the titanium dioxide have been effective, they are limited in certain respects. For example, it can be labor intensive to mix the alkali metal salt, powdered aluminum, and additional agents in accordance with U.S. Pat. No. 5,536,487. Powdered aluminum is pyrophoric and thus hazardous, and the use of multiple mixing devices is cumbersome. Furthermore, the effectiveness of any ionizing agent can be diminished when the pressure at which the oxidization reaction is carried out is increased. It becomes difficult at high operating pressures to achieve titanium dioxide pigment particle sizes suitable for plastics applications. At such pressures, different mechanisms are needed in order to achieve effective particle size control.

SUMMARY OF THE INVENTION

In accordance with the present invention, new approaches for controlling the particle size of rutile titanium dioxide produced by the chloride process have been developed. The new approaches are effective even when the oxidization reaction is carried out at a relatively high pressure, i.e., a reaction pressure of about 15 psig or higher.

The invention is a process for manufacturing titanium dioxide in which a titanium halide (e.g., titanium tetrachloride) and an oxygen-containing gas are continuously reacted in the vapor phase to produce titanium dioxide particles and gaseous reaction products. The oxidization reaction is carried out by combining a reactant stream of the titanium halide and a reactant stream of the oxygen-containing gas in a reaction zone of a vapor phase oxidization reactor at a temperature of at least 700° C. (1292° F.). The titanium dioxide particles are then separated from the gaseous reaction products.

In a first embodiment of the inventive process, a particle size control agent is introduced into the reaction zone in order to control the particle size of the titanium dioxide. Aspects of this embodiment include both the method by which the particle size control agent is introduced to the reaction zone and the nature of the particle size control agent.

In order for an ionizing agent to be fully effective in controlling the particle size of titanium dioxide, the agent must be fully dispersed in the vapor phase and effective in the zone of the oxidization reactor where particle growth is occurring. When the oxidation reaction is carried out at a relatively high pressure, for example, the agent may not be effective if it is added at a point in the reactor that is too close to the zone of the reactor where particle growth is occurring. Modeling studies have indicated that efficient ionization and thorough mixing of an ionizing agent with a reactant stream takes place over a significant distance in the reactor. Simply adding the particle size control agent to the oxidation reactor or at an insufficient distance therefrom does not always allow for enough residence time, particularly under higher reaction pressure conditions.

Thus, in a first aspect of the first embodiment of the inventive process, the oxidation reaction is carried out at a pressure of at least about 15 psig. The particle size control agent comprises an ionizing agent and is introduced to the reaction zone by way of at least one of the reactant streams. The particle size control agent is added to the reactant stream(s) at a sufficient distance upstream of the oxidization reactor to allow the ionizing agent to efficiently ionize and the particle size control agent to thoroughly admix with the stream(s) prior to entering the reaction zone.

It has also been found that a mixture of an ionizing agent and fumed silica is more effective as a particle size control agent than an ionizing agent alone. Fumed silica by itself is difficult to feed consistently as it is very fluffy and has poor flow characteristics. A combination of fumed silica and an ionizing agent such as potassium chloride, however, has sufficient handling characteristics. Both the fumed silica and the ionizing agent function to control the particle size of the titanium dioxide.

Accordingly, in a second aspect of the first embodiment of the inventive process, the particle size control agent comprises an ionizing agent and fumed silica. The weight ratio of the ionizing agent to the fumed silica is preferably in the range of from about 3:1 to about 1:2. The improved particle size control provided by the particle size control agent of this aspect of the invention is achieved at any reaction pressure.

In the inventive process, alumina is preferably added to the reactor in a predetermined amount in order to promote rutilization of the titanium dioxide pigment. Generally, the amount of alumina added to promote rutilization is in the range of from about 0.3% to about 1.5% by weight, preferably about 1.0% by weight, based on the weight of the titanium dioxide being produced. It has now been determined that as the level of alumina added to the oxidization reactor is increased, the particle size of the titanium dioxide decreases. Plant data shows, for example, that the titanium dioxide particle size increases when the alumina chloride generator is off line.

Accordingly, in a second embodiment of the inventive process, the particle size of the titanium dioxide is controlled by increasing the amount of alumina that is introduced to the reaction zone to an amount that is higher than the predetermined amount of alumina added to the reaction zone to promote rutilization of the titanium dioxide. For example, in a titanium dioxide manufacturing process wherein the amount of alumina introduced to the reaction zone to promote rutilization of the titanium dioxide is about 1.0% by weight based on the weight of the titanium dioxide being produced, the particle size of the titanium dioxide can be controlled by increasing the amount of alumina introduced to the reaction zone to an amount in the range of from about 1.5% to about 2.0% by weight based on the weight of the titanium dioxide being produced. The higher amount of alumina also increases the durability of the pigment. This means of controlling the particle size of the titanium dioxide is also effective at all operable reaction pressures.

The various embodiments and aspects of the invention are preferably combined to achieve optimal titanium dioxide particle size control for the particular application.

It is, therefore, a general object of the present invention to provide improved methods of controlling the particle size of titanium dioxide produced by the chloride process, even when the oxidation step of the process is carried out at a relatively high pressure.

Additional objects, features and advantages of the present invention will be readily apparent to those skilled in the art upon a reading of the description of the preferred embodiments which follows when taken in conjunction with the accompanying drawings.

DETAILED DESCRIPTION OF PREFERRED EMBODIMENTS OF THE INVENTION

Figure 1:
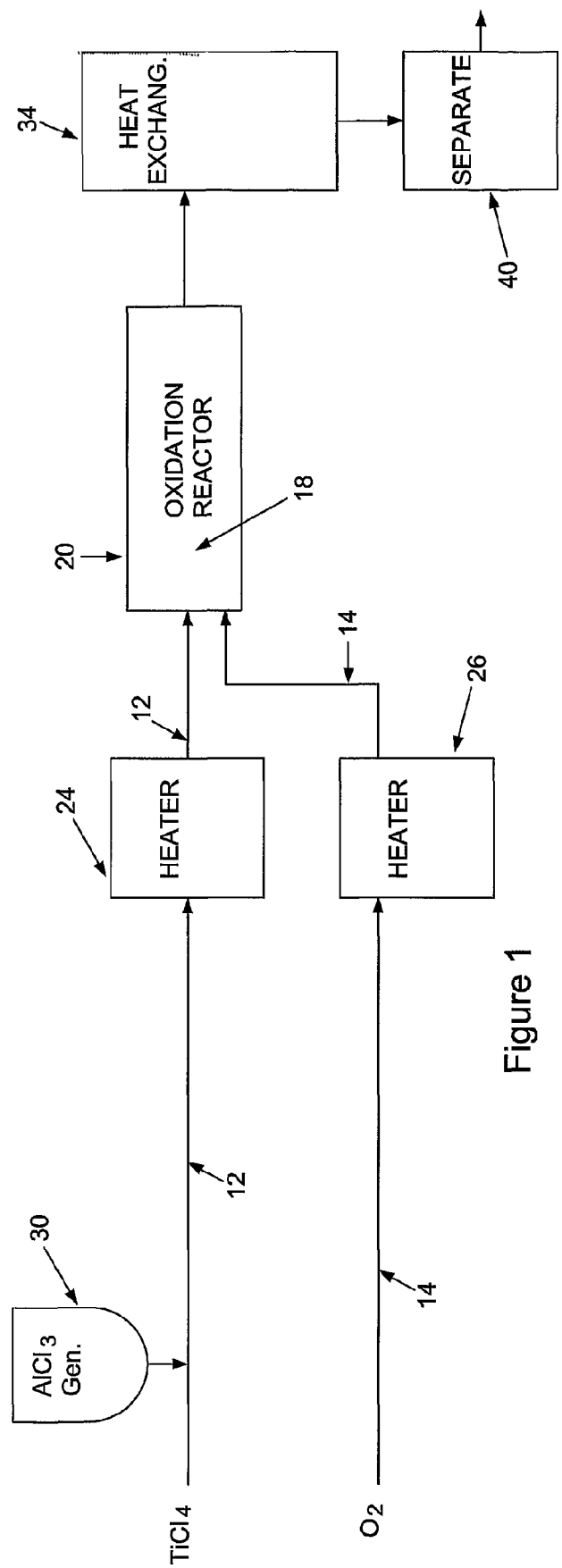
FIG. 1 is a schematic drawing illustrating the inventive process for manufacturing rutile titanium dioxide.

Referring now to FIG. 1, a process for manufacturing titanium dioxide in accordance with the present invention will be described. A titanium halide and an oxygen-containing gas are continuously reacted in the vapor phase to produce titanium dioxide particles and gaseous reaction products. The reaction is carried out by combining a reactant stream 12 of the titanium halide and a reactant stream 14 of the oxygen-containing gas in a reaction zone 18 of an oxidation reactor 20 at a temperature of at least 700° C. (1292° F.).

Prior to being combined in the oxidation reactor 20, the titanium halide and oxygen-containing gas reactant streams are typically preheated, for example, in shell and tube type preheaters 24 and 26. The titanium halide reactant stream is preheated to a temperature in the range of from about 650° F. to about 1800° F., preferably to a temperature in the range of from about 675° F. to about 750° F., in preheater 24. The oxygen-containing gas stream is preheated to a temperature in the range of from about 750° F. to about 3400° F., preferably to a temperature in the range of from about 1740° F. to about 1930° F., in preheater 26.

The heated reacted streams 12 and 14 are then charged to and combined in the tubular oxidation reactor 20 at high flow rates. At a pressure of 1 atmosphere (absolute), the oxidation reaction temperature is typically in the range of from about 2300° F. to about 2500° F. The pressure at which the oxidation reaction is carried out can vary widely, for example from about 3 psig to about 50 psig. An advantage of the invention, however, is that the particle size of the titanium dioxide can be effectively controlled even when the oxidation reaction is carried out at a relatively high pressure, for example, about 15 psig and higher. Accordingly, in accordance with the invention, the oxidation reaction is preferably carried out at a pressure of at least about 15 psig, more preferably at a pressure in the range of from about 15 psig to about 40 psig.

The titanium halide reactant can be any of the known halides of titanium, including titanium tetrachloride ($TiCl_4$), titanium tetrabromide, titanium tetraiodide and titanium tetrafluoride. Preferably, the titanium halide reactant is titanium tetrachloride. Titanium tetrachloride is the titanium halide of choice in most, if not all, vapor phase oxidation processes for producing rutile titanium dioxide pigment. It is oxidized to produce particulate solid titanium dioxide and gaseous reaction products in accordance with the following reaction:

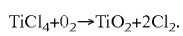

The oxygen-containing gas reactant is preferably molecular oxygen. However, it can also consist of, for example, oxygen in a mixture with air (oxygen enriched air). The particular oxidizing gas employed will depend on a number of factors including the size of the reaction zone within the oxidization reactor, the degree to which the titanium halide and oxygen-containing gas reactants are preheated, the extent to which the surface of the reaction zone is cooled and the throughput rate of the reactants in the reaction zone.

While the exact amounts of the titanium halide and oxidizing gas reactants employed can vary widely and are not particularly critical, it is important that the oxygen-containing gas reactant be present in an amount at least sufficient to provide for a stoichiometric reaction with the titanium halide. Generally, the amount of the oxygen-containing gas reactant employed will be an amount in excess of that required for a stoichiometric reaction with the titanium halide reactant, for example, from about 5% to about 25% in excess of that required for a stoichiometric reaction.

In addition to the titanium halide and oxidizing gas reactants, it is often desirable to introduce other components into the oxidization reactor for various purposes.

Preferably, alumina is introduced into the reaction zone 18 in a predetermined amount that is sufficient to promote rutilization of the titanium dioxide. The amount of alumina needed to promote rutilization of the titanium dioxide varies depending on numerous factors known to those skilled in the art. Generally, the amount required to promote rutilization is in the range of from about 0.3% to about 1.5% by weight based on the weight of the titanium dioxide particles being produced. A typical amount of alumina introduced to the reaction zone 18 is 1.0% by weight based on the weight of the titanium dioxide being produced. As discussed below, in one embodiment of the invention, additional alumina is introduced to the reaction zone 18 of the oxidation reactor 20 in order to control the particle size of the titanium dioxide.

Alumina is preferably introduced into the reaction zone 18 of the oxidation reactor 20 by combining aluminum chloride with one or both of the reactant streams 12 and 14. Preferably, the aluminum chloride is combined with the titanium halide reactant stream 12. The aluminum chloride is preferably generated on-site in an aluminum chloride generator 30 that is in fluid communication with the titanium halide reactant stream 12. Various types of aluminum chloride generators are well known in the art and can be used in the process of the invention. For example, powdered aluminum with or without an inert particulate material can be fluidized in a reactor by the upward passage of reactant chlorine and/or an inert gas. Alternatively, aluminum can be introduced into a stream of chlorine gas in particulate form but not necessarily sufficiently finely divided to fluidize in the gas stream. A fixed bed of particulate aluminum can be chlorinated by passing chlorine to the bed through numerous nozzles surrounding the bed.

An example of another component that can be advantageously introduced into the oxidation reactor 20 is a scouring agent. The scouring agent functions to clean the walls of the reactor and prevent fouling thereof. Examples of scouring agents which can be used include, but are not limited to, sand, mixtures of titanium dioxide and water which are pelletized, dried and sintered, compressed titanium dioxide, rock salt, fused alumina, titanium dioxide and salt mixtures and the like.

The titanium dioxide and gaseous reaction products that are formed in the oxidation reactor are cooled by heat exchange with a cooling medium (such as cooling water) in a tubular heat exchanger 34 to a temperature of about 1300° F. A scouring agent can also be injected into the heat exchanger 34 to remove deposits of titanium dioxide and other materials from the inside surfaces of the heat exchanger. The same types of scouring agents that are used in the reactor 20 can be used in the heat exchanger 34.

After passing through the heat exchanger 34, the particulate solid titanium dioxide is separated from the gaseous reaction products and the scouring agent(s) in separation apparatus 40.

Processes for manufacturing rutile titanium dioxide by the chloride process as generally described above are well known. Illustrative, but non-limiting examples of such processes are described in U.S. Pat. Nos. 3,512,219, 4,803,056, 5,203,916, 5,204,083, 5,573,744, 5,840,112, 5,556,600, 6,207,131 B1 and 6,419,893 B1, each being incorporated by reference herein in its entirety. The various teachings of the above references can be incorporated into the process of the present invention as appropriate and known to those skilled in the art. For example, in order to increase the removal of deposits from the surfaces and thereby increase the heat transfer efficiency in the heat exchanger 34, the scouring agent can be caused to follow a spiral path as it flows through the heat exchanger in accordance with U.S. Pat. No. 6,419,893 B1.

In accordance with a first embodiment of the inventive process, a particle size control agent is introduced into the reaction zone 18 of the oxidization reactor 20 to control the particle size of the titanium dioxide, i.e., to help keep the mean particle size of the titanium dioxide that is being produced from becoming too large. The particle size control agent is preferably introduced to the reaction zone in an amount in the range of from about 100 parts to about 1,000 parts, more preferably from about 250 parts to about 500 parts, per million parts of the titanium dioxide particles being produced.

The particle size control agent can be added to one or more of the reactant streams by a continuous feeder such as a screw feeder. The particle size control agent can also be combined with other components that are added to the reactor. For example, the particle size control agent can be added to scouring agents that are otherwise added to the reactor.

The particle size control agent is preferably added to one or more of the process reactant streams and/or the oxidization reactor as a dry chemical (or a combination of dry chemicals). Alternatively, the particle size control agent includes and is added as an aqueous solution of the component(s). Alcohol or other liquid vehicle suspension systems can also be used. The particle size control agent is preferably introduced to the reaction zone by adding the particle size control agent to at least one of the reactant streams, preferably the titanium halide reactant stream.

Aspects of the first embodiment of the inventive process include both the method by which the particle size control agent is introduced to the reaction zone and the nature of the particle size control agent.

In a first aspect of the first embodiment of the inventive process, the oxidation reaction is carried out at a pressure of at least about 15 psig. The particle size control agent comprises an ionizing agent and is introduced to the reaction zone 18 of the reactor 20 by way of at least one of the reactant streams 12 and 14. The particle size control agent is added to the reactant stream(s) at a sufficient distance upstream of the oxidization reactor 20 to allow the ionizing agent to efficiently ionize and thoroughly admix with the stream(s) prior to entering the reaction zone. Adequate mixing is difficult to achieve, as has been discussed, where the reaction pressures are relatively higher, for example, on the order of about 15 psig or higher. Those skilled in the art will appreciate that what constitutes a "sufficient distance" may vary somewhat based on the reaction pressure used and the characteristics of the particular ionizing agent that is used.

As used herein and in the appended claims, "ionizing agent" means an ion or a molecule or compound that generates ions when combined with one or more process reactants. A "metal ionizing agent" means a metal ion, a metal molecule or a metal-containing compound that generates one or more metal ions when combined with one or more process reactants. The ionizing agent of the particle size control agent should be non-toxic and cost effective. It needs to have sufficient ionizing potential to impart a charge to the titanium dioxide particles under the oxidation conditions. The ionizing agent should also be appropriate for the intended use of the titanium dioxide. For example, when the titanium dioxide is to be used as a pigment, the ionizing agent should not affect the color, brightness or other properties of the pigment. The principles involved in selecting a suitable ionizing agent are well known to those skilled in the art.

Preferably, the ionizing agent of the particle size control agent is a metal ionizing agent. The metal is preferably selected from the group consisting of Groups IA and IIA and the Lanthanide Series of metals of the Periodic Table of the Elements. More preferably, the metal is selected from the group consisting of sodium, potassium, lithium, rubidium, cesium, calcium, barium, strontium, and cerium. Most preferably, the metal is potassium.

In one embodiment, the ionizing agent is potassium chloride. Potassium chloride is relatively inexpensive and easy to handle. In another embodiment, the ionizing agent is a combination of potassium chloride and cesium chloride with the weight ratio of the potassium chloride to cesium chloride in the combination being in the range of from about 100:1 to about 100:9, preferably about 100:3 to about 100:8. Most preferably, the weight ratio of the potassium chloride to the cesium chloride in the combination is about 100:7.

Figure 2:
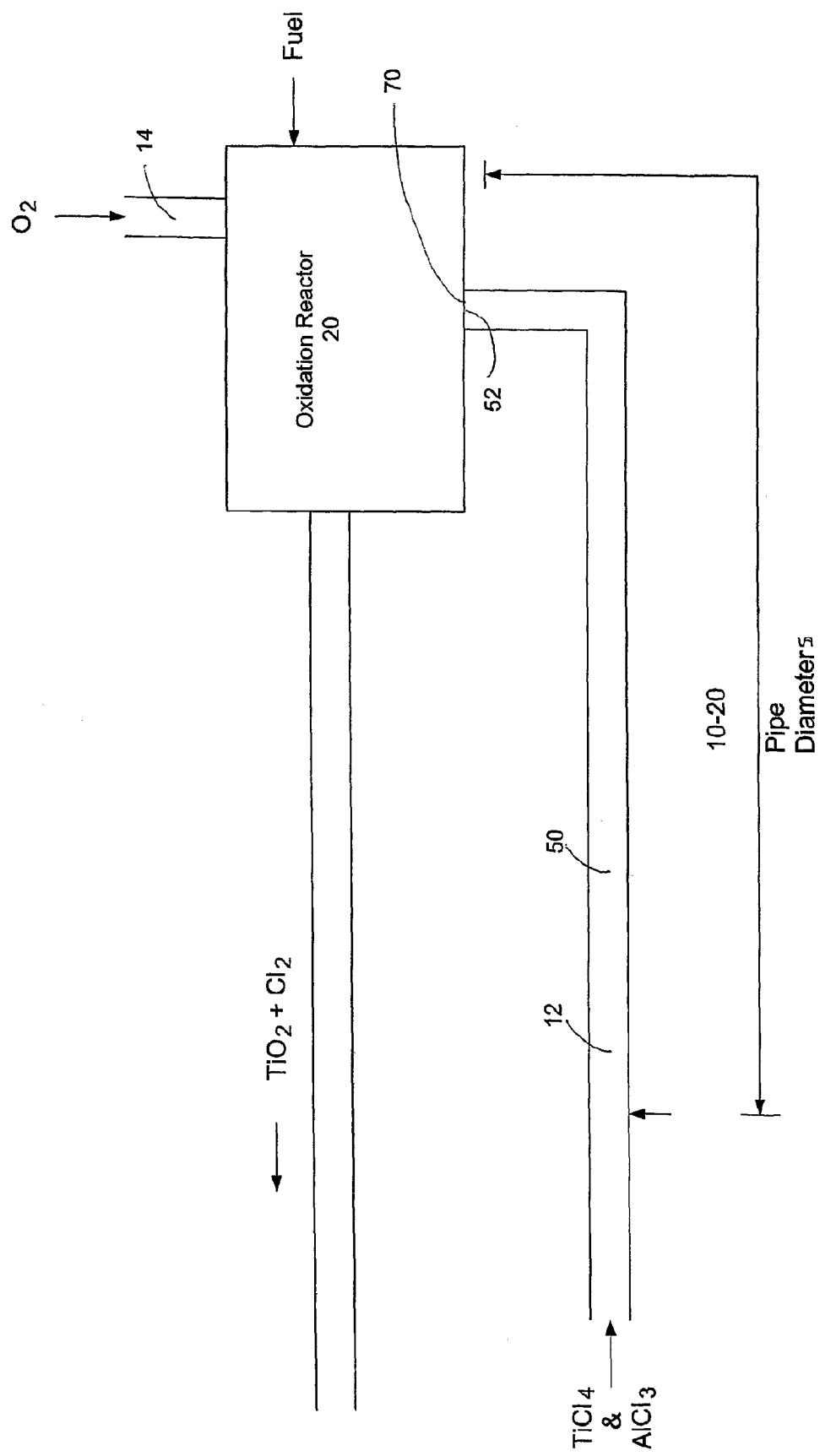
FIG. 2 is a schematic drawing illustrating a point in the process for the addition of an ionization agent that is sufficient to allow the ionizing agent to efficiently ionize and thoroughly admix with the reactant stream.

The titanium halide and oxygen-containing gas reactant streams 12 and 14 are preferably conducted to the oxidation reactor 20 in tubular conduits. In general, for oxidation reaction pressures of about 15 psig or higher, the ionizing agent is preferably combined with at least one of the reactant streams 12 and 14 in the conduit therefor at a point in the conduit that is a distance from the entrance to the oxidation reactor 20 that is at least 10 times the diameter of the conduit at the exit of the conduit, i.e., a distance from the entrance to the oxidization reactor 20 that is at least 10 pipe diameters. The ionizing agent is more preferably combined with at least one of the reactant streams 12 and 14 in the conduit therefor at a point in the conduit that is a distance from the entrance to the oxidization reactor 20 that is in the range of from about 10 to about 50, most preferably from about 10 to about 20, times the diameter of the conduit at the exit of the conduit. For example, referring to FIG. 2, a titanium tetrachloride/aluminum chloride reactant stream 12 is conducted by a tubular conduit 50 to the oxidation reactor 20. The diameter of the conduit, including the diameter of the conduit at the exit 52 thereof, is approximately 6 inches. In accordance with the invention, the ionizing agent is added to the titanium tetrachloride/aluminum chloride reactant stream 12 at a point in the conduit 50 that is a distance from the entrance 70 of the oxidization reactor 20 of about 15 times the diameter of the conduit 50 at the exit 52 of the conduit, i.e., at a distance of 90 inches (7½ feet) from the entrance to the oxidation reactor. This gives the ionizing agent enough residence time to sufficiently ionize and thoroughly admix with the titanium tetrachloride/aluminum chloride stream prior to entering the reaction zone 18 of the oxidation reactor 20. As a result, the ionizing agent is more effective in controlling the particle size of the titanium dioxide particles.

In a second aspect of the first embodiment of the inventive process, the particle size control agent comprises the ionizing agent described above and fumed silica. In this aspect, the fumed silica is a critical component of the particle size control agent. Fumed silica is a colloidal form of silica made by combustion of silicon tetrachloride in hydrogen-oxygen furnaces. It is a fine white powder, with a surface area ranging from about 10 to about 500 $m^2/g$. Preferably, for cost reasons, the fumed silica of the particle size control agent used in the inventive process has a surface area of about 10 $m^2/g$.

The weight ratio of the ionizing agent to the fumed silica in the particle size control agent is preferably in the range of from about 3:1 to about 1:2, more preferably from about 2:1 to about 1:1.5. Most preferably, the weight ratio of the ionizing agent to the fumed silica in the particle size control agent is about 1:1.

In addition to the ionizing agent and fumed silica, the particle size control agent in this aspect of the invention can also include scour media. Examples of scour media that can be used include titanium dioxide, sand, rock salt and alumina beads. Preferably, the scour media is pelletized and sintered titanium dioxide.

As stated above, fumed silica by itself is difficult to feed consistently, as it is very fluffy and has poor flow characteristics. Combining fumed silica with a sufficient amount of an ionizing agent such as potassium chloride results in a mixture that has sufficient handling characteristics to be used in the titanium dioxide manufacturing process. Both the fumed silica and the ionizing agent function to control the particle size of the titanium dioxide. For example, potassium chloride ionizes to potassium cations ($K^+$) and chloride anions ($Cl^-$). While not wishing to be bound by any particular theory, it is believed that the potassium cations then attach to the titanium dioxide particles thereby imparting a charge thereto. The charged titanium dioxide particles tend to repel each other which limits particle coalescence and growth. The exact mechanism of the fumed silica is not as clear. Due to its stability, it is doubtful that the fumed silica independently imparts a charge to the titanium dioxide particles. However, the fumed silica may provide extra nuclei for particle growth, which would tend to make the particles smaller. Another thought is that the fumed silica imparts a surface phenomena that inhibits the coalescence of the particles. It also may be that there is some interaction between the ionizing agent and the fumed silica that makes the ionizing agent more effective than it would be by itself. In any event, the combination of an ionizing agent and fumed silica is more effective than an ionizing agent by itself.

If additional particle size control is necessary, the first embodiment of the inventive process can further comprise the step of separately introducing an ionizing supplement directly to the reaction zone 18 of the oxidation reactor 20. Preferably, the ionizing supplement is introduced to the reaction zone in an amount in the range of from about 10 to about 3,000, more preferably from about 100 to about 1000, parts per million parts of the titanium dioxide particles being produced.

The ionizing supplement is preferably introduced to the reaction zone 18 of the oxidization reactor 20 in at least two separate and discrete increments comprising a first increment and at least one additional increment in accordance with U.S. Pat. No. 5,204,083. The first increment is introduced to the reaction at a point therein prior to onset of reaction between the titanium halide and the oxygen-containing gas within the reaction zone. The additional increment(s) is introduced into the reaction zone at a point therein subsequent to the reaction of at least about 20 weight percent of the titanium halide with the oxygen-containing gas. The first increment of the ionizing supplement is preferably introduced to the reaction zone 18 of the oxidation reactor 20 in an amount of 100 parts per million parts of the titanium dioxide particles being produced. The second increment of the ionizing supplement is preferably introduced to the reaction zone 18 of the oxidation reactor 20 in an amount of 1000 parts per million parts of the titanium dioxide particles being produced.

The ionizing supplement comprises an ionizing agent as described above; e.g., it can be any of the compounds described above in connection with the ionizing agent of the particle size control agent. As with the ionizing agent of the particle size control agent, the ionizing supplement is preferably a metal ionizing agent wherein the metal is selected from the group consisting of Groups IA and IIA and the Lanthanide Series of metals of the Periodic Table of the Elements. Most preferably, the ionizing supplement is potassium chloride.

In a second embodiment of the inventive process, the particle size of the titanium dioxide being produced is controlled by increasing the amount of alumina that is introduced to the reaction zone 18 of the oxidation reactor 20. As stated above, in order to promote rutilization of the titanium dioxide, alumina is added to the reaction zone 18 in a predetermined amount, generally in the range of from about 0.3% to about 1.5% by weight, typically about 1.0% by weight, based on the weight of the titanium dioxide particles being produced. The particle size of the titanium dioxide is decreased by increasing the amount of the alumina that is introduced to the reaction zone to an amount that is higher than the predetermined amount of alumina added to the reaction zone to promote rutilization of the titanium dioxide. For example, in a titanium dioxide manufacturing process wherein the amount of alumina introduced to the reaction zone to promote Utilization of the titanium dioxide is about 1.0% by weight based on the weight of the titanium dioxide being produced, the particle size of the titanium dioxide can be decreased by increasing the amount of alumina introduced to the reaction zone to an amount in the range of from about 1.5% to about 2.0% by weight based on the weight of the titanium dioxide being produced.

In a preferred embodiment, a determination is made of a first amount of alumina that when added to the reaction zone 18 will promote rutilization of the titanium dioxide to a desired degree. For example, the first amount may be 1.0% by weight based on the weight of the titanium dioxide being produced. Next, a determination is made of an additional amount of alumina that when added to the reaction zone will control the particle size of the titanium dioxide to a desired degree. For example, the additional amount may be 0.5% by weight based on the weight of the titanium dioxide being produced. The first amount and the additional amount of alumina (which would be a total of 1.5% by weight alumina based on the weight of the titanium dioxide being produced using the above numbers) are then introduced to the reaction zone 18 to promote rutilization of and control the particle size of the titanium dioxide. The first amount and the additional amount can be added separately or together. Preferably, the first amount and the additional amount are added together to the titanium halide reactant stream 12 by the aluminum chloride generator 30. Preferably, the total amount of alumina that is introduced to the reaction zone to promote rutilization and control the particle size of the titanium dioxide is in the range of from about 0.5% by weight to about 2.0% by weight, based on the weight of the titanium dioxide being produced.

The various embodiments and aspects of the invention for controlling the particle size of the titanium dioxide can be combined to achieve the optimum result for the particular application. All of the approaches are effective even when the oxidization step is carried out at a relatively high pressure.

Many advantages are achieved in accordance with the invention. For example, by adding the particle size control agent to one or more reactant streams at a point that is a distance from the entrance to the oxidization reactor, for example, of at least about 10 pipe diameters, efficient ionization and thorough mixing of the particle size control agent is assured when the oxidation reaction is carried out at a relatively high pressure. The combination of fumed silica with an ionizing agent increases the effectiveness of the ionizing agent. The combination also allows fumed silica, which is too difficult to handle by itself, to be used. The discovery that the particle size of the titanium dioxide can be controlled merely by increasing the amount of alumina added to the reaction zone provides for a very simple solution to the particle size problem. Because alumina is already introduced to the reaction zone, the process set up and equipment required for the alumina addition are already present. Additional alumina also improves the durability of titanium dioxide pigments.

The titanium dioxide manufactured in accordance with the inventive process is very suitable for use as a pigment, including grades of pigments in which the particle size of the pigment is important. For example, the titanium dioxide manufactured in accordance with the invention is very suitable for use as a plastics grade pigment. The present invention can be used to manufacture titanium dioxide having a mean particle size in the range of from about 0.18 microns to about 0.25 microns. The invention is particularly suitable for manufacturing titanium dioxide having a mean particle size of less than 0.22 microns.

The following examples are provided to further illustrate the effectiveness of the inventive method and composition.

EXAMPLES

The following examples are provided to further illustrate the effectiveness of the various embodiments and aspects of the inventive process.

In each test, a vapor phase oxidation reactor of the type disclosed in U.S. Pat. Nos. 4,803,056 and 5,204,083, each assigned to Kerr-McGee Chemical Company LLC, was used. The reactor included a single oxygen ($O_2$) reactant inlet assembly. A $TiCl_4$ reactant inlet assembly was located downstream of the $O_2$ reactant inlet assembly. The actual oxidation of the $TiCl_4$ reactant took place in a pair of tubular reaction zones. Unless noted otherwise, the oxidation reaction was generally carried out at a pressure between 15 and 20 psig.

Unless noted otherwise, an aluminum chloride generator was used to add aluminum chloride ($AlCl_3$) to the titanium tetrachloride ($TiCi_4$) reactant stream. The aluminum chloride generator was in fluid communication with the $TiCl_4$ reactant stream a point in the conduit for the $TiCl_4$ reactant stream that was a distance upstream of the $TiCl_4$ reactant inlet assembly of at least 10 times the diameter of the conduit at the exit of the conduit, i.e., a distance from the $TiCl_4$ reactant inlet assembly of at least 10 pipe diameters. Except in those runs in which it is indicated that no or only a very small amount of alumina (e.g., 0.04 or 0.07 wt. %) was imparted to the titanium dioxide, in each of the tests the amount of alumina introduced to the reactor was sufficient to achieve high titanium dioxide rutilization, for example, 99.8% or better.

The $O_2$ and $TiCl_4$ reactants were combined in the reactor in an approximately stoichiometric ratio plus an excess of the $O_2$ reactant of about 10 weight percent. In each run conducted, the $O_2$ was preheated to a temperature of about 960° C. (1760° F.) prior to its introduction to the reactor through the $O_2$ reactant inlet assembly. The $TiCl_4$ reactant was added to the reactor through the $TiCl_4$ inlet assembly in one stage at a temperature of 400-450° C. (752-842° F.). Propane was combined with the $O_2$ reactant stream as a supplementary fuel. The combined reaction temperature of the preheated $O_2$, $TiCl_4$ and fuel was in the range of from 1370° C. (2498° F.) to 1500° C. (2732° F.). Scour media was introduced directly to the reactor through the $O_2$ reactant inlet assembly.

In each run, a base amount of potassium chloride (KCl) was added to the reactor as an ionizing supplement. The base amount of KCl, 3000 parts per million parts of the titanium dioxide being produced, was introduced directly to the reactor in two separate and discrete increments. The first increment was introduced with the scour media through the $O_2$ reactant inlet assembly. The amount of the first KCl increment ranged from about 10 to about 200 parts per million parts of the titanium dioxide being produced. The second increment, which was the balance of the KCl base amount, was introduced downstream of the $O_2$ reactant inlet assembly at a point in the reaction zone where the reaction of $TiCl_4$ was approximately 20% complete. The second increment was added by a volumetric feeder and pneumatic conveying system through an orifice in a flange.

Following the oxidation in the second reaction zone, the hot gaseous reaction stream was quickly cooled by passing the stream through an externally cooled conduit affixed to the downstream end of the reaction zone. The titanium dioxide product suspended in this cooled stream was then separated from the stream by conventional solids/gas separation equipment.

The mean particle size of the separated titanium dioxide was then determined by a spectrophotometric technique, SFM2. By the SFM2 technique, the absorbance or transmittance of various wavelengths of light through a suspension of the titanium dioxide particles was measured. The specific absorbance or transmittance of the wavelengths is dependent on the size of the particles. The ratio of the absorbance of light at 400 and 700 nanometers (nm) was measured. A larger SFM2 value indicates smaller particles.

Example I

In one series of tests, various amounts of KCl and mixtures of KCl and fumed silica were added to the $TiCl_4$ reactant stream as a titanium dioxide particle size control agent. The KCl and KCl/fumed silica mixtures were pneumatically conveyed and added to the $TiCl_4$ reactant conduit at a point in the conduit that was a distance upstream of the $TiCl_4$ inlet assembly of at least 10 times the diameter of the conduit at the exit of the conduit, i.e., a distance from the $TiCl_4$ inlet assembly of at least 10 pipe diameters.

Data from the first series of tests is shown in Table 1 below. The amounts of the KCl and KCl/fumed silica mixtures used in the tests and shown by Table 1 below are in addition to the base amount of KCl added to the reactor in each run as an ionizing supplement as described above.

TABLE 1

Use of KCl/Fumed Silica as Particle Control Agent

| Sample | Particle Size Control Agent* | SFM2** |
|---|---|---|
| 1 | None | 87 |
| 2 | None | 87 |
| Avg. | | 87 |
| 3 | 250 ppm KCl | 97 |
| 4 | 250 ppm KCl | 100 |
| 5 | 250 ppm KCl | 100 |
| 6 | 250 ppm KCl | 90 |
| Avg. | | 97 |
| Avg. shift: | | 10 units |
| 7 | None | 86 |
| 8 | 250 ppm KCl | 97 |
| Avg. | | 92 |
| 9 | 250 ppm KCl | 102 |
| 10 | 250 ppm KCl | 100 |
| 11 | 250 ppm KCl | 100 |
| 12 | 250 ppm KCl | 103 |
| 13 | 250 ppm KCl | 103 |
| 14 | 250 ppm KCl | 103 |
| Avg. | | 102 |
| Avg. shift: | | 10 units |
| 15 | None | 97 |
| 16 | None | 99 |
| Avg. | | 98 |
| 17 | 826 ppm KCl | 114 |
| 18 | 825 ppm KCl | 115 |
| 19 | 825 ppm KCl | 112 |
| 20 | 825 ppm KCl | 113 |
| 21 | 825 ppm KCl | 113 |
| 22 | 825 ppm KCl | 112 |
| Avg. | | 113 |
| Avg. shift: | | 15 units |
| 23 | None | 110 |
| 24 | None | 110 |
| 25 | None | 110 |
| Avg. | | 110 |
| 26 | 250 ppm KCl + 250 ppm $SiO_2$ | 124 |
| 27 | 250 ppm KCl + 250 ppm $SiO_2$ | 124 |
| 28 | 250 ppm KCl + 250 ppm $SiO_2$ | 118 |
| 29 | 250 ppm KCl + 250 ppm $SiO_2$ | 123 |
| 30 | 250 ppm KCl + 250 ppm $SiO_2$ | 118 |
| 31 | 250 ppm KCl + 250 ppm $SiO_2$ | 120 |
| | | 121 |
| | | 12 units |
| 32 | None | 116 |
| 33 | 500 ppm KCl + 500 ppm $SiO_2$ | 132 |
| 34 | 500 ppm KCl + 500 ppm $SiO_2$ | 144 |
| 35 | 500 ppm KCl + 500 ppm $SiO_2$ | 148 |
| 36 | 500 ppm KCl + 500 ppm $SiO_2$ | 149 |
| 37 | 500 ppm KCl + 500 ppm $SiO_2$ | 151 |
| 38 | 500 ppm KCl + 500 ppm $SiO_2$ | 150 |
| Avg. | | 146 |
| Avg. shift: | | 30 units |

*The particle size control agent was added to the $TiCl_4$ reactant stream at a distance upstream of the oxidation reactor of at least 10 pipe diameters to allow the potassium to efficiently ionize and the particle size control agent to thoroughly admix with the stream. In each run, including the runs in which the particle size control agent was not employed, 3000 ppm of an ionizing supplement (KCl) were added directly to the reactor.
**The SFM2 values reflect the mean particle size of the titanium dioxide. SFM2 is a spectrophotometric technique used as a measure of particle size. The absorbance or transmittance of various wavelengths of light through a suspension of particles is dependent on the size of the particles present. SFM2 measures the ratio of the absorbance of light at 400 and 700 nm. A larger value indicates smaller particles.

As shown by Table 1, adding a particle size control agent to a reactant stream at a distance upstream of the oxidation reactor of at least 10 pipe diameters allows the ionizing agent to effectively ionize and the particle size control agent to thoroughly admix with the stream resulting in consistent control of the particle size of the titanium dioxide. The data also shows that a mixture of KCl and fumed silica is more effective as a titanium dioxide particle size control agent than KCl alone. The shift in particle size was substantially greater when the fumed silica was included in the particle size control agent.

Example II

In another series of tests, various amounts of KCl and mixtures of KCl and cesium chloride (CsCl) were added to aluminum chloride generator as a titanium dioxide particle size control agent.

The KCl and KCl/CsCl mixtures were added as dry chemicals to a port in the top of the aluminum chloride generator. As noted above, the aluminum chloride generator was in fluid communication with the $TiCl_4$ reactant stream a point in the conduit for the $TiCl_4$ reactant stream that was a distance upstream of the $TiCl_4$ inlet assembly of at least 10 times the diameter of the conduit at the exit of the conduit, i.e., a distance from the $TiCl_4$ inlet assembly of at least 10 pipe diameters.

Data from this series of tests is shown in Table 2 below. The amounts of the KCl and KCl/CsCl mixtures used in the tests and shown by Table 1 below are in addition to the base amount of KCl added to the reactor in each run as an ionizing supplement as described above.

TABLE 2

Use of KCl and KCl/CsCl as Particle Control Agent

| Sample | Particle Size Control Agent* | SFM2** |
|---|---|---|
| 1 | None | 104 |
| 2 | None | 108 |
| 3 | 100 ppm KCl | 117 |
| 4 | 100 ppm KCl | 120 |
| 5 | 100 ppm KCl | 104 |
| 6 | 100 ppm KCl | 118 |
| 7 | 100 ppm KCl | 118 |
| 8 | 100 ppm KCl + 7 ppm CsCl | 114 |
| 9 | 100 ppm KCl + 7 ppm CsCl | 100 |
| 10 | 100 ppm KCl + 7 ppm CsCl | 104 |

*The particle size control agent was added to the $TiCl_4$ reactant stream at a distance upstream of the oxidation reactor of at least 10 pipe diameters to allow the potassium to efficiently ionize and the particle size control agent to thoroughly admix with the stream. In each run, including the runs in which the particle size control agent was not employed, 3000 ppm of an ionizing supplement (KCl) were added directly to the reactor.
**The SFM2 values reflect the mean particle size of the titanium dioxide. SFM2 is a spectrophotometric technique used as a measure of particle size. The absorbance or transmittance of various wavelengths of light through a suspension of particles is dependent on the size of the particles present. SFM2 measures the ratio of the absorbance of light at 400 and 700 nm. A larger value indicates smaller particles.

The data shown in Table 2 confirms that adding a particle size control agent to the $TiCl_4$ reactant stream at a distance upstream of the oxidation reactor of at least 10 pipe diameters allows the ionizing agent to effectively ionize and admix with the stream resulting in consistent control of the particle size of the titanium dioxide. When so added, KCl alone was just as or more effective than the KCl/CsCl mixture in controlling the titanium dioxide particle size. Although the tests were carried out at an oxidation pressure under 20 psig, the shifts attainable with low amounts of the particle size control agent demonstrate that increasing the amount of the particle size control agent even modestly should allow for even higher pressure operations, up to perhaps 40 to 50 psig.

Example III

In another series of tests, the amount of alumina ($Al_2O_3$) introduced to the reaction zone of the reactor was again varied to determine the impact of the amount of alumina on the particle size of the titanium dioxide. The amount of alumina was varied by changing the amount of aluminum chloride added to the $TiCl_4$ reactant stream by the aluminum chloride generator. Specifically, the aluminum and chlorine rates to the generator were varied.

In addition, various amounts of KCl and mixtures of KCl and fumed silica were added to the $TiCl_4$ reactant stream as a titanium dioxide particle size control agent. The KCl and KCl/fumed silica mixtures were pneumatically conveyed and added to the $TiCl_4$ reactant conduit at a point in the conduit that was a distance upstream of the $TiCl_4$ inlet assembly of at least 10 times the diameter of the conduit at the exit of the conduit, i.e., a distance from the $TiCl_4$ inlet assembly of at least 10 pipe diameters.

Data from this series of tests is shown in Table 3 below. The amounts of the KCl and KCl/fumed silica mixtures used in the tests and shown by Table 1 below are in addition to the base amount of KCl added to the reactor in each run as an ionizing supplement as described above.

TABLE 3

Effect of Amount of Alumina on $TiO_2$ Particle Size
Use of KCl/Fumed Silica as Particle Control Agent

| Sample | Amount of Alumina* | Particle Size Control Agent** | SFM2*** |
|---|---|---|---|
| 1 | 0.79% | None | 101 |
| 2 | 0.07% | None | 82 |
| 3 | 0.04% | None | 80 |
| 4 | None | None | 95 |
| 5 | 1.7-2.0% | None | 108 |
| 6 | 1.7-2.0% | 250 ppm KCl + 250 ppm $SiO_2$ | 138 |
| 7 | 1.7-2.0% | 250 ppm KCl + 250 ppm $SiO_2$ | 144 |
| 8 | 1.7-2.0% | 250 ppm KCl + 250 ppm $SiO_2$ | 147 |
| 9 | 1.7-2.0% | 250 ppm KCl + 250 ppm $SiO_2$ | 149 |
| 10 | 1.7-2.0% | 250 ppm KCl + 250 ppm $SiO_2$ | 147 |
| 11 | 1.7-2.0% | 250 ppm KCl + 250 ppm $SiO_2$ | 140 |
| 12 | None | None | 112 |

*The percent by weight alumina ($Al_2O_3$), based on the weight of the $TiO_2$ being produced, imparted to the titanium dioxide.
**The particle size control agent was added to the $TiCl_4$ reactant stream at a distance upstream of the oxidation reactor of at least 10 pipe diameters to allow the potassium to efficiently ionize and the particle size control agent to thoroughly admix with the stream. In each run, including the runs in which the particle size control agent was not employed, 3000 ppm of an ionizing supplement (KCl) were added directly to the reactor.
***The SFM2 values reflect the mean particle size of the titanium dioxide. SFM2 is a spectrophotometric technique used as a measure of particle size. The absorbance or transmittance of various wavelengths of light through a suspension of particles is dependent on the size of the particles present. SFM2 measures the ratio of the absorbance of light at 400 and 700 nm. A larger value indicates smaller particles.

As shown by Table 3, a significant shift in the particle size of the titanium dioxide results from increasing the amount of alumina imparted to the titanium dioxide from zero or a low amount (e.g., 0.07 weight percent) to 0.79 weight percent. A very significant decrease in the particle size of the titanium dioxide was seen at an alumina amount of 1.7-2.0 weight percent. The increase in the amount of alumina together with the addition of a particle size control agent to the $TiCl_4$ reactant stream in accordance with the invention resulted in a very significant shift in the particle size of the titanium dioxide.

Example IV

In another series of tests, the amount of alumina ($Al_2O_3$) introduced to the reaction zone of the reactor was again varied to determine the impact of the amount of alumina on the particle size of the titanium dioxide. The amount of alumina was varied by changing the amount of aluminum chloride added to the $TiCl_4$ reactant stream by the aluminum chloride generator. Specifically, the aluminum and chlorine rates to the generator were varied.

In addition, various amounts of KCl and mixtures of KCl and fumed silica were added to the $TiCl_4$ reactant stream as a titanium dioxide particle size control agent. The KCl and KCl/fumed silica mixtures were pneumatically conveyed and added to the TiCl$_4$ reactant conduit at a point in the conduit that was a distance upstream of the TiCl$_4$ inlet assembly of at least 10 times the diameter of the conduit at the exit of the conduit, i.e., a distance from the TiCl$_4$ inlet assembly of at least 10 pipe diameters.

In this series of tests, the pressure at which the oxidation reaction was carried out was varied. In runs 1-17, the pressure was 18-19 psig. In runs 18-28, the pressure was 34-37 psig. In run 29, the pressure was 15-18 psig.

Data from this series of tests is shown in Table 4 below. The amounts of the KCl and KCl/fumed silica mixtures used in the tests and shown by Table 4 below are in addition to the base amount of KCl added to the reactor in each run as an ionizing supplement as described above.

TABLE 4

Effect of Amount of Alumina on TiO$_2$ Particle Size
Use of KCl/Fumed Silica as Particle Control Agent

| Sample | Amount of Alumina[4] | Particle Size Control Agents[5] | SFM2[6] |
|---|---|---|---|
| 1[1] | 0.8% | | 91 |
| 2[1] | 0.8% | | 93 |
| 3[1] | 1.0% | | 94 |
| 4[1] | 1.0% | | 90 |
| 5[1] | 1.2% | | 119 |
| 6[1] | 1.2% | | 116 |
| 7[1] | 1.5% | | 118 |
| 8[1] | 1.5% | | 118 |
| 9[1] | 1.5% | 250 ppm KCl + 500 ppm SiO$_2$ | 130 |
| 10[1] | 1.5% | 250 ppm KCl + 500 ppm SiO$_2$ | 126 |
| 11[1] | 1.5% | 250 ppm KCl + 500 ppm SiO$_2$ | 126 |
| 12[1] | 1.5% | 250 ppm KCl + 500 ppm SiO$_2$ | 121 |
| 13[1] | 1.5% | 250 ppm KCl + 500 ppm SiO$_2$ | 112 |
| 14[1] | 1.5% | 250 ppm KCl + 500 ppm SiO$_2$ | 104 |
| 15[1] | 1.5% | 250 ppm KCl + 500 ppm SiO$_2$ | 110 |
| 16[1] | 1.5% | None | 118 |
| 17[1] | 1.5% | None | 116 |
| 18[2] | 0.67% | None | 82 |
| 19[2] | 1.1% | None | 85 |
| 20[2] | 0.76% | None | 82 |
| 21[2] | 0.61% | None | 83 |
| 22[2] | 0.62% | None | 81 |
| 23[2] | 0.63% | None | 84 |
| 24[2] | 0.66% | None | 83 |
| 25[2] | 0.63% | None | 87 |
| 26[2] | 0.68% | None | 85 |
| 27[2] | 0.85% | 250 ppm KCl | 101 |
| 28[2] | 1.6% | | 91 |
| 29[3] | 0.68% | None | 97 |

[1]In this run, the pressure at which the oxidation reaction was carried out was from 18-19 psig.
[2]In this run, the pressure at which the oxidation reaction was carried out was from 34-37 psig.
[3]In this run, the pressure at which the oxidation reaction was carried out was from 15-18 psig.
[4]The percent by weight alumina (Al$_2$O$_3$), based on the weight of the TiO$_2$ being produced, imparted to the titanium dioxide.
[5]The particle size control agent was added to the TiCl$_4$ reactant stream at a distance upstream of the oxidation reactor of at least 10 pipe diameters to allow the potassium to efficiently ionize and the particle size control agent to thoroughly admix with the stream. In each run, including the runs in which the particle size control agent was not employed, 3000 ppm of an ionizing supplement (KCl) were added directly to the reactor.
[6]The SFM2 values reflect the mean particle size of the titanium dioxide. SFM2 is a spectrophotometric technique used as a measure of particle size. The absorbance or transmittance of various wavelengths of light through a suspension of particles is dependent on the size of the particles present. SFM2 measures the ratio of the absorbance of light at 400 and 700 nm. A larger value indicates smaller particles.

As shown by Table 4, a significant shift in the particle size of the titanium dioxide results from increasing the amount of alumina imparted to the titanium dioxide. The titanium particle size control resulting from increasing the amount of alumina is also seen at higher reactor operating pressures. Again, the addition of a particle size control agent to the TiCl$_4$ reactant stream in accordance with the invention also resulted in a very significant and supplemental shift in the particle size of the titanium dioxide.

Example V

In yet another series of tests, the amount of alumina (Al$_2$O$_3$) introduced to the reaction zone of the reactor was varied to determine the impact of the amount of alumina on the particle size of the titanium dioxide.

The same type of reactor and overall test procedure described in connection with Examples I-IV above was used. However, in this series of tests, an aluminum chloride generator was not used to impart alumina to the reactor. Rather, granular aluminum chloride (in varying amounts) was pneumatically conveyed and introduced to the TiCl$_4$ reactant stream. The aluminum chloride was added to the TiCl$_4$ reactant conduit at a point in the conduit that was a distance upstream of the TiCl$_4$ inlet assembly of at least 10 times the diameter of the conduit at the exit of the conduit, i.e., a distance from the TiCl$_4$ inlet assembly of at least 10 pipe diameters. Also, the oxidation reaction is this series of test was carried out at a pressure in the range of from 5 psig to 10 psig. Finally, instead of using the SFM2 technique to analyze the particle size of the titanium dioxide, the standard carbon black undertone ("CBU") test was used. In accordance with this test, the particle size of the titanium dioxide was determined by mixing a pigment sample with carbon black in a paste, then comparing the measured color undertone to that of a standard pigment with a Hunterlab color difference meter. The X, Y and Zirconium values of the color difference meter are used to calculate CBU. The CBU units represent a measure of average particle size, as reflected light from a pigment sample goes from blue to red as particle size goes from small to large. More negative values indicate smaller particles.

Figure 3:
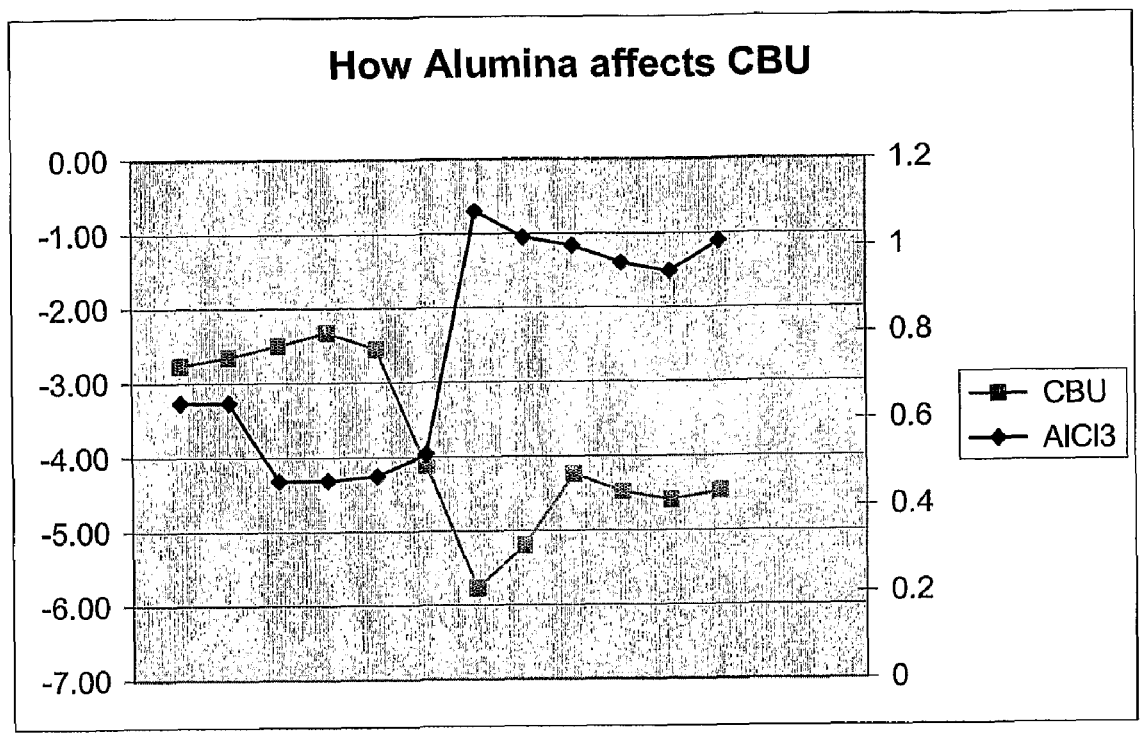
FIG. 3 is a graph referenced in Example III and showing the effect on the particle size of the titanium dioxide by varying the amount of alumina added to the pigment.

Data from this series of tests is shown in a graph present as FIG. 3 of the drawings. The left axis shows the CBU values (more negative is smaller, while the right axis shows the alumina level of the pigment for the corresponding CBU sample. As shown, as the amount of aluminum chloride added to the TiCl$_4$ reactant conduit increased, the particle size of the titanium dioxide (expressed as CBU units) decreased.

Thus, the present invention is well adapted to carry out the objects and attain the ends and advantages mentioned as well as those which are inherent therein. While numerous changes may be suggested to those skilled in the art, such changes are encompassed within the spirit of this invention as defined by the following claims.

What is claimed is:

1. A process for manufacturing titanium dioxide, comprising:
    continuously reacting a titanium halide and an oxygen-containing gas in the vapor phase to produce titanium dioxide particles and gaseous reaction products, said reaction being carried out by combining a reactant stream of said titanium halide and a reactant stream of said oxygen-containing gas in a reaction zone of a vapor phase oxidation reactor at a temperature of at least 700° C.;
    introducing a particle size control agent into said reaction zone to control the particle size of said titanium dioxide, said particle size control agent including an ionizing agent and fumed silica; and
    separating said titanium dioxide particles from said gaseous reaction products.

2. The process of claim 1, wherein said titanium halide is titanium tetrachloride.

3. The process of claim 1, wherein said reaction is carried out at a pressure of at least about 15 psig.

4. The process of claim 3, wherein said particle control agent is introduced to said reaction zone by adding said particle control agent to at least one of said reactant streams at a sufficient distance upstream of said oxidation reactor to allow said ionizing agent to efficiently ionize and said particle control agent in general to thoroughly admix with said stream(s) prior to entering said reaction zone.

5. The process of claim 1, further comprising the step of introducing alumina to said reaction zone in a predetermined amount to promote rutilization of said titanium dioxide particles.

6. The process of claim 5, further comprising controlling the particle size of said titanium dioxide by increasing the amount of alumina that is introduced to said reaction zone to an amount that is higher than said predetermined amount of alumina introduced to said reaction zone to promote rutilization of said titanium dioxide particles.

7. The process of claim 1, wherein said ionizing agent is a metal ionizing agent.

8. The process of claim 7, wherein said metal is selected from the group consisting of Groups IA and IIA and the Lanthanide Series of metals of the Periodic Table of the Elements.

9. The process of claim 1, wherein said ionizing agent is potassium chloride.

10. The process of claim 1, wherein said ionizing agent is a combination of potassium chloride and cesium chloride, the weight ratio of said potassium chloride and cesium chloride in said combination being in the range of from 100:1 to 100:9.

11. The process of claim 1, wherein said particle size control agent further includes scour media.

12. The process of claim 1, wherein the weight ratio of said ionizing agent to said fumed silica in said particle control agent is in the range of from about 3:1 to about 1:2.

13. The process of claim 12, wherein the weight ratio of said metal ionizing agent to said fumed silica in said particle control agent is about 1:1.

14. The process of claim 1, wherein said particle control agent is introduced to said reaction zone in an amount in the range of from about 100 parts to about 1,000 parts per million parts of said titanium dioxide particles being produced.

15. The process of claim 14, further comprising the step of separately introducing an ionizing supplement directly to said reaction zone of said oxidation reactor.

16. The process of claim 15, wherein ionizing supplement is introduced to said reaction zone in an amount in the range of from about 10 to about 3000 parts per million parts of said titanium dioxide particles being produced.

17. The process of claim 16, wherein said ionizing supplement is introduced to said reaction zone of said oxidation reactor in at least two separate and discrete increments comprising a first increment and at least one additional increment, wherein said first increment is introduced to said reaction zone at a point therein prior to onset of reaction between said titanium halide and said oxygen-containing gas within said reaction zone, and wherein said at least one additional increment is introduced into said reaction zone at a point therein subsequent to the reaction of at least about 20 weight percent of said titanium halide with said oxygen-containing gas.

18. The process of claim 16, wherein said ionizing supplement is potassium chloride.

19. A process for manufacturing titanium dioxide, comprising:
   continuously reacting a titanium halide and an oxygen-containing gas in the vapor phase to produce titanium dioxide particles and gaseous reaction products, said reaction being carried out by combining a reactant stream of said titanium halide and a reactant stream of said oxygen-containing gas in a reaction zone of a vapor phase oxidation reactor at a temperature of at least 700° C. and a reaction pressure of at least about 15 psig;
   introducing a particle size control agent into said reaction zone by addition to the titanium halide reactant stream, said particle size control agent including a metal ionizing agent and fumed silica, wherein said metal of said metal ionizing agent is selected from the group consisting of sodium, potassium, lithium, rubidium, cesium, calcium, barium, strontium, and cerium, and the weight ratio of said metal ionizing agent to said fumed silica in said particle size control agent is in the range of from about 3:1 to about 1:2, said particle size control agent being introduced to said reaction zone by adding said particle size control agent to at least one of said reactant streams at a sufficient distance upstream of said oxidation reactor to allow said metal ionizing agent to efficiently ionize and thoroughly admix with said stream(s) prior to entering said reaction zone; and
   separating said titanium dioxide particles from said gaseous reaction products.

20. The process of claim 19, wherein at least one of said titanium halide reactant stream and said oxygen-containing gas reactant stream is conducted to said oxidation reactor in a tubular conduit, and said particle size control agent is combined with said reactant stream in said tubular conduit at a point in said conduit that is a distance from the entrance to said oxidation reactor that is at least about 10 times the diameter of said conduit at the exit of said conduit.

* * * * *

UNITED STATES PATENT AND TRADEMARK OFFICE
CERTIFICATE OF CORRECTION

| | | Page 1 of 1 |
|---|---|---|
| PATENT NO. | : 7,854,917 B2 | |
| APPLICATION NO. | : 12/067091 | |
| DATED | : December 21, 2010 | |
| INVENTOR(S) | : Harry E. Flynn et al. | |

It is certified that error appears in the above-identified patent and that said Letters Patent is hereby corrected as shown below:

Column 9
Line 38, delete "Utilization" and substitute "utilization" therefor.

Signed and Sealed this

Seventeenth Day of May, 2011

David J. Kappos
*Director of the United States Patent and Trademark Office*

UNITED STATES PATENT AND TRADEMARK OFFICE
CERTIFICATE OF CORRECTION

PATENT NO.        : 7,854,917 B2                                          Page 1 of 1
APPLICATION NO.   : 12/067091
DATED             : December 21, 2010
INVENTOR(S)       : Harry E. Flynn et al.

It is certified that error appears in the above-identified patent and that said Letters Patent is hereby corrected as shown below:

Column 9
Line 38, delete "Utilization" and substitute "rutilization" therefor.

This certificate supersedes the Certificate of Correction issued May 17, 2011.

Signed and Sealed this
Eleventh Day of October, 2011

David J. Kappos
*Director of the United States Patent and Trademark Office*